United States Patent [19]

Figov

[11] Patent Number: 5,623,001
[45] Date of Patent: Apr. 22, 1997

[54] INK COMPOSITIONS AND A METHOD FOR MAKING SAME

[75] Inventor: Murray Figov, Ra'anana, Israel

[73] Assignee: Scitex Corporation Ltd., Herzlia, Israel

[21] Appl. No.: 527,594

[22] Filed: Sep. 13, 1995

[30] Foreign Application Priority Data

Sep. 21, 1994 [IL] Israel .......................................... 111014

[51] Int. Cl.$^6$ .................................. C09D 11/10; C08J 3/28
[52] U.S. Cl. ....................... 522/84; 106/20 B; 106/20 D; 106/22 B; 522/75; 522/78; 522/79; 523/160; 523/161
[58] Field of Search ................................. 106/20 B, 20 D, 106/22 B; 522/75, 78, 79, 84; 523/160, 161

[56] References Cited

U.S. PATENT DOCUMENTS

| | | | |
|---|---|---|---|
| 3,835,085 | 9/1974 | Wrzesinski | 522/84 |
| 4,125,503 | 11/1978 | McCarty et al. | 522/79 |
| 4,303,924 | 12/1981 | Young | 346/1.1 |
| 4,451,509 | 5/1984 | Frank et al. | 522/84 |
| 4,499,175 | 2/1985 | Curtis et al. | 522/75 |
| 4,499,176 | 2/1985 | Curtis et al. | 522/75 |
| 4,791,213 | 12/1988 | Gawne et al. | 522/84 |
| 4,978,969 | 12/1990 | Chieng | 106/22 B |
| 5,270,368 | 12/1993 | Lent et al. | 524/236 |
| 5,275,646 | 1/1994 | Marshall et al. | 106/20 B |
| 5,326,669 | 7/1994 | Curtis | 525/61 |

FOREIGN PATENT DOCUMENTS 0407054  6/1990  European Pat. Off. ........ C09D 11/10

*Primary Examiner*—Peter A. Szekely
*Attorney, Agent, or Firm*—Lowe, Price, LeBlanc & Becker

[57] ABSTRACT

UV curable ink-jet inks for continuous ink-jet printing and drop on demand (DOD) ink-jet printing are provided which are preferably applied to substrates capable of absorbing part of an ink droplet applied thereupon. The ink compositions of the present invention include a mixture of water which serves as a solvent, a water miscible polymerizable material capable of being cured upon the application of UV light, a photoinitiator, and a colorant which may be a dye or a color pigment. The ink compositions may also include a bridging fluid.

17 Claims, No Drawings

INK COMPOSITIONS AND A METHOD FOR MAKING SAME

FIELD OF THE INVENTION

The present invention relates generally to ink compositions and more particularly to ink compositions useful in ink-jet printing.

BACKGROUND OF THE INVENTION

There are known in the art two main processes of ink jet printing. In one process, usually called continuous ink-jet printing, a stream of ink drops are electrically charged and then are deflected by an electric field either directly or indirectly onto the substrate. Inks used in continuous ink-jet printing are electrically conductive and typically, are water based inks. The viscosity of such inks is typically 2 or 3 centipoise (cps) and generally does not exceed 10 cps.

In the second process, usually called Drop on Demand (DOD) ink-jet printing, the ink supply is regulated by an actuator such as a piezoelectric actuator. The pressure produced during the actuation forces a droplet through a nozzle or nozzles onto the substrate. Inks for DOD ink-jet printing do not need to be conductive and their viscosity is typically between 2 and 40 cps.

One type of prior art ink-jet ink is a water based ink-jet ink. A drawback of prior art water based ink-jet inks is that they dry slowly on paper. Another drawback of prior art water based inks is that they can be washed off the paper with water and they can be smudged with a wet finger.

Another type of prior art ink-jet ink is an ultra violet (UV) curable ink. Typically, prior art UV curable inks include polymerizable monomers or oligomers or a mixture thereof, all of which are miscible in organic solvents and are not miscible in water.

UV curable ink-jet inks based on organic solvents are particularly useful for printing on hard, non-absorbing substrates such as plastics. For example, U.S. Pat. No. 5,270,368 to Lent et al. describes a UV curable ink-jet ink for printing on printed circuit boards. Similarly, Published European Application No. 0,407,054 A1 describes an ink-jet ink for printing on plastic and metal surfaces where the ink is characterized by good adhesion properties.

One drawback of UV curable ink-jet inks based on organic solvents is their limited usefulness in printing on absorbing surfaces, such as paper. When printed on paper the inks penetrate through the paper and are seen from the back side of the paper. This is known in the art as "strike-through". Another drawback of such inks is that organic solvents, in particular volatile organic solvents, are potentially environmentally hazardous.

SUMMARY OF THE INVENTION

It is therefore an object of the present invention to provide improved UV curable ink-jet ink compositions both for continuous ink-jet printing and for DOD ink-jet printing which overcome the drawbacks of prior art UV curable ink-jet inks.

The ink-jet ink compositions of the present invention comprise a mixture of water, a water-miscible polymerizable material, a colorant and a photo-initiator. The composition may also include a non-volatile bridging fluid.

According to one aspect of the invention, the ink compositions are formulated such that they are characterized by viscosities suitable for ink-jet printing and by good absorption properties when printed on substrates, such as paper, capable of absorbing fluids.

According to another aspect of the present invention, the inks of the present invention may be dried by UV curing and absorption into the substrate, both of which occur simultaneously.

There is thus provided, according to the present invention, an ultraviolet radiation curable ink composition which includes, in combination, water, a water miscible ultra-violet curable polymerizable material, a photoinitiator and a colorant.

Further, according to the present invention, the polymerizable material is formed mainly of an oligomer. Alternatively, the polymerizable material may be formed from a mixture of an oligomer and a monomer.

Additionally, the water content of the ink compositions may be between 10% and 75% by weight, the polymerizable material content may be between 20% and 60% by weight and the photoinitiator content is preferably less than 12% by weight.

Further, the ink composition, according to the present invention, may also include a bridging fluid, the content of which may be between 2% and 30% by weight.

Additionally, the oligomer may be an acrylic oligomer and preferably an acrylic oligomer such as one selected from the group consisting of polyethylene glycol diacrylate, ethoxylated trimethylol propane acrylate and polyether acrylate.

Additionally, the monomer may be selected from the group consisting of 2 Hydroxy-3-methylacryloxy propyltrimethylammonium chloride, hydroxyalkyl acrylate and dimethylaminoethyl acrylate.

Additionally, the photoinitiator may be selected from the group consisting of isopropylthioxanthone, 4-benzoyl-4'-methyl diphenyl sulphide, 1-Hydroxy-cyclohexyl-phenyl-ketone and 2-Methyl-1-(4-(methylthio)phenyl)-2-morpholinopropanone-1, 1-(4-Dodecylphenyl)-2-hydroxy-2-methyl-propan-1-one, dibutoxyacetophenone hydroxymethyl phenylpropane-1-one and 4-benzoylbenzyl trimethylammonium chloride, 4-benzoyl-N, N-dimethyl-[2-(1-oxo-2-propenyloxy)-ethyl]- benzene methanaminium bromide and 2-hydroxy-3-3(3,4-dimethyl)9-oxo-9H-thioxanthen-2yloxy)-N,N,N-trimethyl1-propaminiumchloride.

Additionally, the bridging fluid may be selected from the group consisting of N-methyl 2-pyrrolidone, N-vinyl pyrrolidone, 2-amino ethanol. 2-butoxy ethanol, ethyl lactate and morpholine.

Further, the ink compositions of the present invention have a viscosity between 2–40 centipoise and their colorant may be a dye.

Further, there is provided, according to the present invention, a method of formulating the ink including the steps of combining at least one water miscible polymerizable material with water and a photoinitiator to form a homogeneous mixture thereof, selecting a colorant and combining the colorant with the mixture to receive a homogeneous ink composition therefrom.

Additionally, the step of combining may include the step of combining a bridging fluid into the mixture before the step of selecting a colorant. Preferably, before a colorant is selected, the mixture is a clear solution.

Further, there is provided, according to the present invention, a method of printing ink on a substrate comprising, in order, the steps of providing printing apparatus for delivering ink to a substrate, supplying an ink composition to the printing apparatus, delivering the ink composition to the printing substrate and irradiating the substrate with an ultra-violet light source, thereby curing the ink composition, wherein the ink composition includes water, a water miscible ultra-violet curable polymerizable material, a photoinitiator and a colorant.

Preferably, the step of irradiating is simultaneous with the absorption of the water in the substrate.

Further, the printing method includes the step of heating the ink composition on the printed substrate wherein the step of the heating includes heating by a radiation source selected of the group of IR radiation and microwave radiation.

Preferably, the substrate is paper and the printing apparatus is ink jet printing apparatus.

DETAILED DESCRIPTION OF THE PRESENT INVENTION

The present invention provides UV curable ink-jet inks for continuous ink-jet printing and drop on demand (DOD)ink-jet printing which are preferably applied to substrates capable of absorbing part of an ink droplet applied thereupon.

Ink compositions of the present invention include a mixture of water which serves as a solvent, a water miscible polymerizable material capable of being cured upon the application of UV light, a photoinitiator, and a colorant which may be a dye or a color pigment. The polymerizable material or materials of the ink compositions may be any suitable water miscible oligomer or a mixture of any suitable water miscible oligomer and water miscible monomers, preferably, but not necessarily, water miscible acrylic oligomers and monomers.

The ink compositions of the present; invention may also include a bridging fluid. The term "bridging fluid" refers herein to any fluid having a high boiling temperature and a low viscosity which has good miscibility properties both with water and with the polymerizable material or materials.

It will be appreciated that while the term "water miscible" is used herein, any of the water miscible compounds may be also water soluble.

The water content of the inks of the present invention may be between 10% and 75% by weight. More preferably, the water content of the ink is between 20% and 60% by weight.

The polymerizable material is preferably an oligomer or a combination of a monomer and an oligomer. Preferably, the content of the polymerizable material is between 20% and 60% by weight. The polymerizable material may be any water miscible oligomer or a combination of an oligomer and a monomer, all of which polymerize when exposed to UV light.

Preferably, acrylic oligomers, such as the poly-acrylate CN 435, manufactured and sold by Cray Valley Products of Exton, Pa., USA, are used to form the ink compositions of the present invention. Preferred oligomers are oligomers which include ethoxylated groups derived from polyethylene glycols. Examples of such materials are polyethylene glycol diacrylate sold by UCB as Ebecryl 11, Photomers 4155 and 4158—ethoxylated trimethylol propane acrylate sold by Henkel, Sartomer 344—a polyethylene glycol 400 diacrylate sold by Cray Valley and CN 435—a polyether acrylate (ethoxylated trifunctional). These materials are commercially available as oligomers. However, other polyol acrylates are commercially available as monomers because of their relatively low molecular weight and their inability to form films without the presence of an oligomer.

Preferably, the amount of oligomer used is typically between 20% and 60% since in this range the oligomer produces sufficient film-forming properties to effectively dry during UV curing and the viscosity of the ink formulation is within the desired range for ink-jet printing.

According to the present invention, monomers may be added as additives to the oligomer. This may be done to increase the water solubility of the polymerizable material. An example of such a material is 2 Hydroxy-3-methylacryloxy propyltrimethylammonium chloride, sold by Servo Delden BV as a 50% aqueous solution. Further examples are hydroxyalkyl acrylate and dimethylaminoethyl acrylate.

The ink compositions of the present invention include a photoinitiator which absorb the UV light and initiates, for example by producing free radicals, the polymerization of the oligomer or the oligomer and the monomer. Examples of suitable photoinitiators are isopropylthioxanthone, 4-benzoyl-4'-methyl diphenyl sulphide, 1-Hydroxy-cyclohexyl-phenyl-ketone, 2-Methyl-1-(4-(methylthio)phenyl)-2-morpholinopropanone-1, 1-(4-Dodecylphenyl)-2-hydroxy-2-methyl-propan-1-one, dibutoxyacetophenone hydroxymethyl phenylpropane-1-one, 4-benzoylbenzyl trimethylammonium chloride, 4-benzoyl-N, N-dimethyl-[2-(1-oxo-2-propenyloxy)-ethyl]-benzene methanaminium bromide, 2-hydroxy-2-methyl-1-phenylpropane-1-one and 2-hydroxy-3(3,4-dimethyl)9-oxo-9H-thioxanthen-2yloxy)-N,N,N-trimethyl-1-propaminium chloride.

The total amount of initiator in the system may be as high as 12% because of the quenching effect of the dye colorant. High photoinitiator concentrations are preferred when black dyes are used. Preferably, liquid photoinitiators may be used because they contribute minimally to viscosity. Preferably, the content of the photoinitiator exceeds 2% by weight.

The ink compositions may also include synergists and stabilizers.

According to the present invention, the ink compositions may also include a bridging fluid. Examples of such materials are N-methyl 2-pyrrolidone, N-vinyl pyrrolidone, 2-amino ethanol, 2-butoxy ethanol, ethyl lactate and morpholine. Preferably, the content of the bridging fluid may be between 2% and 30% by weight.

One method of formulating the ink compositions of the present invention may involve the use of oligomers, monomers or both. The desired viscosity of the ink compositions of the present invention is typically achieved by dilution with water or also with water and bridging fluids. Therefore the ink compositions of the present invention are generally more environmentally friendly than those prior art ink compositions which include volatile organic solvents.

According to a method of formulating the ink compositions of the present invention, the uncolored ingredients are mixed together and then a colorant is added to the mixture. Preferably, the mixture of the uncolored ingredients is a stable solution and not an emulsion.

According to a preferred method of printing using the inks of the present invention, UV curing is used simultaneous With drying by absorption. According to one preferred method of printing, the ink is applied to an absorbing substrate, such as paper, by any suitable ink-jet printer. The UV radiation is then applied and it may increase the viscosity of the ink by cross linkage which immobilizes the ink and thereby reduces set-off of ink from one sheet to the next sheet of paper. The cross-linkage also reduces strike-through and the spread of ink into the paper. Simultaneously, with the UV radiation, part of the water is absorbed by the paper.

It is a particular feature of the present invention that ink compositions need not be heated to drive off the water before UV curing. However, according to one preferred method of printing, the ink compositions may be heated by any suitable form of radiation such as IR radiation, heat or microwave radiation, before or after curing.

According to another preferred method of printing, the application of the UV light follows some absorption of the ink in the substrate.

It will be appreciated that ink compositions of the present invention may be formulated with a wide range of surface tensions to suit the particular ink jet system being used. Since water has a high surface tension and non-volatile bridging fluids typically have relatively low surface tensions, mixtures can be made with intermediate surface tensions.

It will also be appreciated that the presence of water permits the introduction of a wide range of ionic salts into the ink compositions. Therefore, the ink compositions of the present invention may be made with conductivities suitable for continuous ink-jet printing.

The ink compositions of the present invention may be formulated with a wide range of colorants which include water soluble as well as water insoluble dyes.

The present invention will be understood and appreciated more fully from the following non limiting examples of ink compositions produced in accordance with the present invention. All parts are by weight. Viscosity measurements were made with a cone and plate Brookfield DVIII Programmable Rheometer at a shear rate of $75sec^{-1}$. Surface tension measurements were made using a Fisher Scientific Surface Tensiometer 20 with a platinum ring. The inks were cured with a 400 W Dymax 5000-EC light source which is a medium pressure mercury vapor lamp giving a broad spectrum of UVA, UVB and UVC light at $100mW/cm^2$.

EXAMPLE I 470 parts of the polyethylene glycol diacrylate oligomer, sold as Ebecryl 11, were mixed with 390 parts of deionized water and the mixture was stirred until a completely clear light brown liquid was obtained. 117 parts of hydroxymethyl phenylpropane-1-one, sold by Ciba Geigy as Daracur 1173, were slowly added in conditions of subdued light and stirred in so that the liquid remained clear. 27 parts of an alcohol soluble nigrosine were stirred in. The resulting ink was suitable for use in piezo ink jet heads. It had a measured viscosity of 16.0 centipoise at 16° C. and a surface tension of 38.5 dynes per cm. Tests showed that after illumination with the UV lamp the inks were cured. Prints on paper were not smeared by rubbing even with a wet finger.

COMPARISON EXAMPLE

An attempt to formulate a water miscible UV curable ink was made with the formulation described in Published European Application No. 0,407,054 A1.

200 parts of N-vinyl pyrollidone were mixed in with 600 parts of GAFGARD 233 to give a clear homogenous solution. 150 parts of water were added gradually with stirring. The clear solution gradually became opaque and white as the water was added. It was evident that an emulsion had been formed. The mixture was left to stand for a day, after which it could be seen that water had separated out on the surface of the mixture and the composition could not have been used as an ink.

EXAMPLE II 407 parts of a polyether acrylate (ethoxylated trifuntional), sold by Cray Valley as CN 435, were added to 185 parts of ethyl lactate and stirred to give a completely clear homogenous solution. 301 parts of deionized water were slowly added by stirring in subdued light, followed by 83 parts of hydroxymethyl phenylpropane-1-one. The resulting solution was completely clear. It is especially suitable for colored inks where the purity of color is important (for example, process colored inks). In this particular example, for the purposes of testing in the most exacting conditions, 24.9 parts of an alcohol soluble nigrosine dye was added. Black dyes tend to make U.V. curing difficult, but as in Example I, the ink was successfully UV cured. The ink had a viscosity of 17.5 centipoise at 25° C. and a surface tension of 42 dynes per cm.

EXAMPLE III 312 parts of Ebecryl 11 were added to 121 parts of n-methyl pyrrolidone with stirring until a homogenous solution was achieved. 432 parts of deionized water were then slowly added by stirring in subdued light, followed by 104 parts of hydroxymethyl phenyl propane-1-one. 30.5 parts of naphthol blue black were then mixed in to give an ink suitable for drop-on-demand ink jet printing. The ink had a viscosity of 12 centipoise at 25° C. and a surface tension of 42.5 dynes per cm. The ink was successfully UV cured.

EXAMPLE IV

The method of mixing and use was as for EXAMPLE I. The ingredients were as follows;

| | |
|---|---|
| 266 parts | Ebecryl 11 |
| 103 parts | n-methyl pyrrolidone |
| 521 parts | deionized water |
| 84 parts | 2-hydroxy-2-methyl-1-phenylpropane-1-one |
| 26 parts | naphthol blue black |

The resulting ink had a viscosity 8.1 centipoise and a surface tension of 43 dynes per cm. The ink was successfully UV cured.

EXAMPLE V

The method of mixing was as for EXAMPLE I. The ingredients and quantities are listed below. This ink may be used both for continuous jet and drop-on-demand.

| | |
|---|---|
| 262 parts | Ebecryl 11 |
| 109 parts | n-methyl pyrrolidone. |
| 507 parts | deionized water |
| 12.6 parts | sodium chloride |
| 84 parts | 2-hydroxy-2-methyl-1-phenylpropane-1-one |
| 25 parts | alcohol soluble nigrosine |

The resulting ink had a viscosity of 8.6 cps, a surface tension 43.3 dynes/cm and a conductivity of 52 milliSiemans/cm. The ink was successfully UV cured.

EXAMPLE VI 273 parts of Ebecryl 11 were mixed with 114 parts of Sartomer 344 until a homogenous mixture was obtained. 496 parts of deionized water were stirred in, followed by 91.5 parts of hydroxymethyl phenyl propane-1-one. 25.6 parts of naphthol blue black were then added with stirring.

The resulting ink had a viscosity of 11.6 centipoise and a surface tension of 41.3 dynes per cm. When deposited on papers, whether hard surface or absorbent, it U.V. cured in less than a second.

EXAMPLE VII

To 338 parts of Ebecryl 11, 132 parts of n-methyl pyrrolidone were added followed by 5.7 parts of 1-hydroxy-cyclohexyl-phenyl-ketone, 12.7 parts of 2-methyl-1-[4-(methylthio)phenyl-2-morpholinopropanone-1] and 12 parts of benzildimethylketal. The mixture was warmed to 400° C. and 470 parts of deionized water were added by stirring. Finally, 27.7 parts of alcohol soluble nigrosine were added. The resulting ink jet ink had a viscosity of 6.7 centipoise and surface tension of 43.2.dynes per cm. The ink was successfully UV cured.

It will be appreciated by persons skilled in the art that the present invention is not limited by what has been particularly shown and described herein above. Rather the scope of the invention is defined by thee claims which follow:

I claim:

1. An ultraviolet radiation curable ink-jet ink composition comprising in combination:
   a. water, said water content being between about 20% and 75% by weight;
   b. a water miscible ultra-violet curable polymerizable material;
   c. a photoinitiator; and
   d. a colorant,
   wherein the viscosity of said ink-jet ink composition is between about 2–40 centipoise.

2. An ink composition according to claim 1 wherein said polymerizable material comprises an oligomer.

3. An ink composition according to claim 1 wherein said polymerizable material comprises a mixture of an oligomer and a monomer.

4. An ink composition according to claim 1 wherein the content of said polymerizable material is between 20% and 60% by weight.

5. An ink composition according to claim 1 wherein the content of said photoinitiator is less than or equal to 12%.

6. An ink composition according to claim 1 and also including a bridging fluid.

7. An ink composition according to claim 6 wherein the content of said bridging fluid is between 2% and 30% by weight.

8. An ink composition according to claim 2 wherein said oligomer is an acrylic oligomer.

9. An ink composition according to claim 8 wherein said acrylic oligomer is a polyethylene glycol acrylate.

10. An ink composition according to claim 9 wherein said polyethylene acrylate is selected from the group consisting of:
    polyethylene glycol diacrylate;
    ethoxylated trimethylol propane acrylate; and
    polyether acrylate.

11. An ink composition according to claim 6 wherein said bridging fluid is selected from the group consisting of:
    N-methyl 2-pyrrolidone;
    N-vinyl pyrrolidone;
    2-amino ethanol;
    2-butoxy ethanol;
    ethyl lactate; and
    morpholine.

12. An ink composition according to claim 3 wherein said monomer is selected from the group consisting of:
    2 Hydroxy-3-methylacryloxy propyltrimethylammonium chloride;
    hydroxyalkyl acrylate; and
    dimethylaminoethyl acrylate.

13. An ink composition according to claim 1 wherein said photoinitiator is selected from the group consisting of:
    isopropylthioxanthone;
    4-benzoyl-4'-methyl diphenyl sulphide;
    1-Hydroxy-cyclohexyl-phenyl-ketone;
    2-Methyl-1-(4-(methylthio)phenyl)-2-morpholinopropanone-1;
    1-(4-Dodecylphenyl)-2-hydroxy-2-methyl-propane-1-one;
    dibutoxyacetophenone hydroxymethyl phenylpropane-1-one;
    4-benzoylbenzyl trimethylammonium chloride;
    4-benzoyl-N,-N-dimethyl-[2-(1-oxo-2-propenyloxy)-ethyl]-benzene methanaminium bromide;
    2-hydroxy-2-methyl-1-phenylpropane-1-one; and
    2-hydroxy-3(3,4-dimethyl)9-oxo-9H-thioxanthen-2yloxy)-N,N,N-trimethyl-1-propaminiumchloride.

14. An ink composition according to claim 1 wherein said colorant is a dye.

15. A method far formulating the ink-jet ink composition of claim 1 comprising the steps of:
    a. combining at least one water miscible polymerizable material with water, the water content being between about 20% and 75% and a photoinitiator to form a homogeneous mixture thereof;
    b. selecting a colorant; and
    c. combining said colorant with said mixture to produce a homogeneous ink-jet ink composition having a viscosity of about 2–40 centipoise therefrom.

16. A method according to claim 15 wherein said step of combining also includes the step of mixing in said bridging fluid.

17. A method according to any of claim 15 wherein, before said step of selecting, said mixture is a clear solution.

* * * * *